United States Patent
Gao et al.

(10) Patent No.: US 9,489,518 B2
(45) Date of Patent: Nov. 8, 2016

(54) METHOD AND DEVICE FOR UNLOCKING SCREEN

(71) Applicant: Xiaomi Inc., Beijing (CN)

(72) Inventors: Chengxing Gao, Beijing (CN); Weixing Li, Beijing (CN); Tao Peng, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/144,170

(22) Filed: Dec. 30, 2013

(65) Prior Publication Data

US 2014/0223189 A1 Aug. 7, 2014

Related U.S. Application Data

(63) Continuation of application No. PCT/CN2013/083500, filed on Sep. 13, 2013.

(30) Foreign Application Priority Data

Feb. 6, 2013 (CN) .......................... 2013 1 0048417

(51) Int. Cl.
*G06F 21/60* (2013.01)
*G06F 21/84* (2013.01)

(52) U.S. Cl.
CPC ............ *G06F 21/602* (2013.01); *G06F 21/84* (2013.01)

(58) Field of Classification Search
CPC combination set(s) only.
See application file for complete search history.

(56) References Cited

U.S. PATENT DOCUMENTS

| 6,725,382 | B1 * | 4/2004 | Thompson et al. ............ 726/19 |
| 2007/0198856 | A1 * | 8/2007 | Lee et al. ...................... 713/190 |
| 2009/0316960 | A1 | 12/2009 | Wang |
| 2012/0023458 | A1 | 1/2012 | Chaudhri et al. |
| 2012/0304302 | A1 | 11/2012 | Stecher |
| 2013/0194067 | A1 * | 8/2013 | Kimbrell ...................... 340/5.54 |
| 2013/0326611 | A1 * | 12/2013 | Gargi ............................ 726/16 |

FOREIGN PATENT DOCUMENTS

| CN | 101616003 A | 12/2009 |
| CN | 101616500 | 12/2009 |
| CN | 101826961 A | 9/2010 |
| CN | 101980131 A | 2/2011 |
| CN | 102455839 | 5/2012 |

(Continued)

OTHER PUBLICATIONS

International Search Report, issued by State Intellectual Property Office of the P.R. China as the ISA, mailed on Dec. 12, 2013, in International Application No. PCT/CN2013/083500 (9 pages including translation).

(Continued)

*Primary Examiner* — Beemnet Dada
(74) *Attorney, Agent, or Firm* — Finnegan, Henderson, Farabow, Garrett & Dunner LLP (57) ABSTRACT

A method for unlocking a screen of a device, including: detecting an inputting operation on the device for inputting an unlock password, the inputting operation causing one character to be inputted to the device; performing, in response to the detecting, a comparison to determine whether all input characters corresponding to a password indicator displayed on the screen match a preset password; and unlocking the screen of the device if it is determined that all the input characters corresponding to the password indicator match the preset password.

15 Claims, 9 Drawing Sheets

(56) References Cited

FOREIGN PATENT DOCUMENTS

| | | |
|---|---|---|
| CN | 102469080 A | 5/2012 |
| CN | 102567680 | 7/2012 |
| CN | 102880398 A | 1/2013 |
| CN | 103092484 | 5/2013 |
| JP | 08-249284 A | 9/1996 |
| JP | 2001-202484 A | 7/2001 |
| JP | 2001-216046 A | 8/2001 |
| JP | 2006-059336 | 3/2006 |
| JP | 2006-155382 | 6/2006 |
| JP | 2008-033747 A | 2/2008 |
| KR | 10-2011-0082675 | 7/2011 |
| TW | 201137658 | 11/2011 |
| WO | WO 2012/096075 | 7/2012 |

OTHER PUBLICATIONS

Office Action of Russian Application No. 2015124196/08, issued by Russian Patent Office, dated Jun. 1, 2016 (13 pages including translation).

Extended European Search Report for European Application No. 13874801.7 from the European Patent Office, dated Aug. 22, 2016.

* cited by examiner

METHOD AND DEVICE FOR UNLOCKING SCREEN

CROSS-REFERENCE TO RELATED APPLICATIONS

This application is a continuation of International Application No. PCT/CN2013/083500, filed Sep. 13, 2013, which is based upon and claims priority to Chinese Patent Application No. 201310048417.0, filed Feb. 6, 2013, the entire contents of which are incorporated herein by reference.

TECHNICAL FIELD

The present disclosure generally relates to a screen control field, and more particularly, to a method and device for unlocking a screen.

BACKGROUND

A mobile phone generally provides a password setting to protect personal information of a user of the mobile phone. The user needs to correctly input a preset password to unlock the screen when using the mobile phone.

A password can consist of number(s) and/or letter(s). Conventionally, the password can be classified as a fixed-length password or an unfixed-length password. If the mobile phone accepts a password of a fixed, specified length, the password is referred to as a fixed-length password. If the mobile phone accepts a password of a variable length in a range, the password is referred to as an unfixed-length password.

Conventionally, to unlock the screen of the mobile phone, the user needs to click, e.g., an "UNLOCK" icon, on the screen after the user inputs the password.

SUMMARY

According to a first aspect of the present disclosure, there is provided a method for unlocking a screen of a device, comprising: detecting an inputting operation on the device for inputting an unlock password, the inputting operation causing one character to be inputted to the device; performing, in response to the detecting, a comparison to determine whether all input characters corresponding to a password indicator displayed on the screen match a preset password; and unlocking the screen of the device if it is determined that all the input characters corresponding to the password indicator match the preset password.

According to a second aspect of the present disclosure, there is provided a device, comprising: a processor; and a screen, wherein the processor is configured to: detect an inputting operation on the device for inputting an unlock password, the inputting operation causing one character to be inputted to the device; perform, in response to the detecting, a comparison to determine whether all input characters corresponding to a password indicator displayed on the screen match a preset password; and unlock the screen if it is determined that all the input characters corresponding to the password indicator match the preset password.

According to a third aspect of the present disclosure, there is provided non-transitory computer-readable medium having stored therein instructions that, when executed by a processor of a device, cause the device to perform a method for unlocking a screen of the device, the method comprising: detecting an inputting operation on the device for inputting an unlock password, the inputting operation causing one character to be inputted to the device; performing, in response to the detecting, a comparison to determine whether all input characters corresponding to a password indicator displayed on the screen match a preset password; and unlocking the screen of the device if it is determined that all the input characters corresponding to the password indicator match the preset password.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
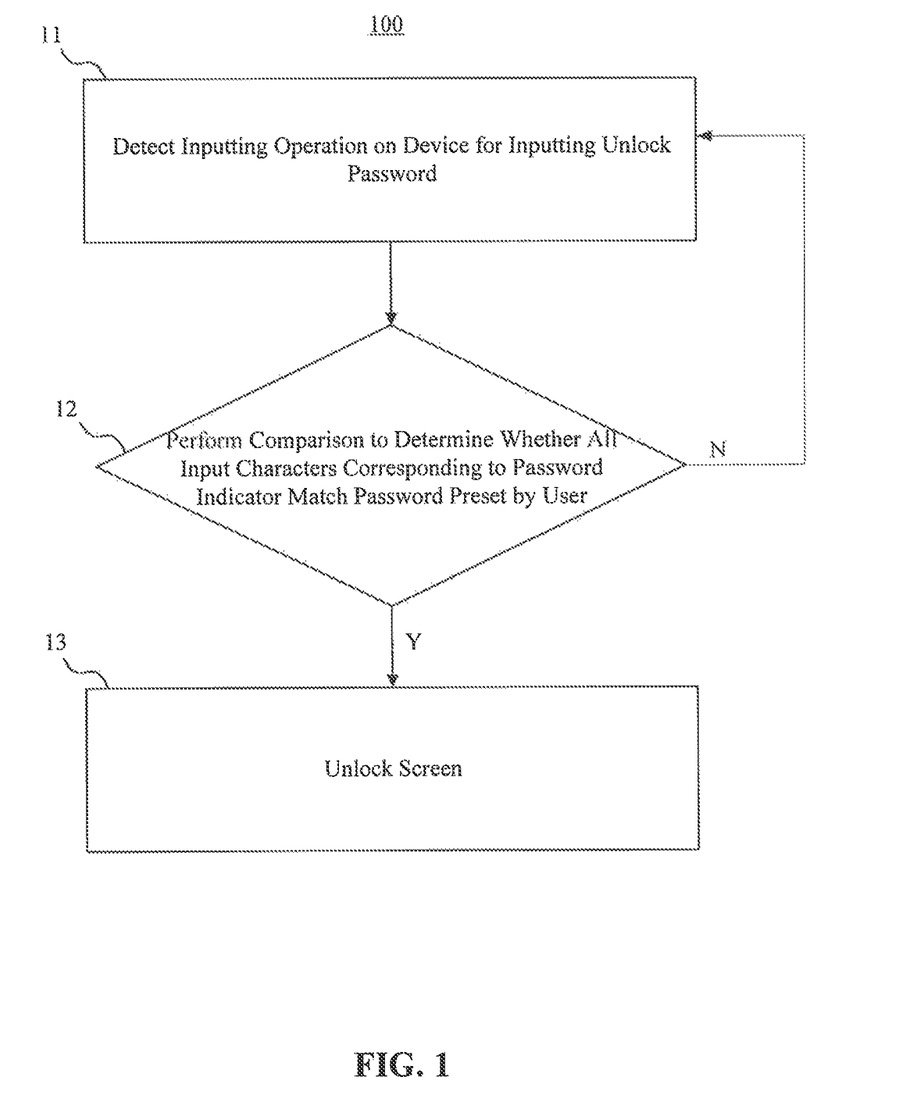
FIG. 1 is a flowchart of a method for unlocking a screen of a device, according to an exemplary embodiment.

FIG. 1 is a flowchart of a method 100 for unlocking a screen of a device, according to an exemplary embodiment. For example, the device may be a mobile terminal. Referring to FIG. 1, the method 100 includes the following steps.

In step 11, the device detects an inputting operation by a user on the device for inputting an unlock password, the inputting operation causing one character to be inputted to the device. In step 12, the device performs a comparison to determine whether all input characters corresponding to a password indicator displayed on the screen match a password preset by the user. The device proceeds to step 13 if it is determined that all the input characters corresponding to the password indicator match the preset password; otherwise, the device returns to the detecting (step 11). In step 13, the device unlocks the screen.

In the method 100, the screen can be unlocked directly after the unlock password is correctly inputted by the user without an additional icon, e.g., an "UNLOCK" icon, on the screen being clicked. As a result, the user's operation is simplified, whether the unlock password is a fixed-length password or an unfixed-length password.

Figure 2:
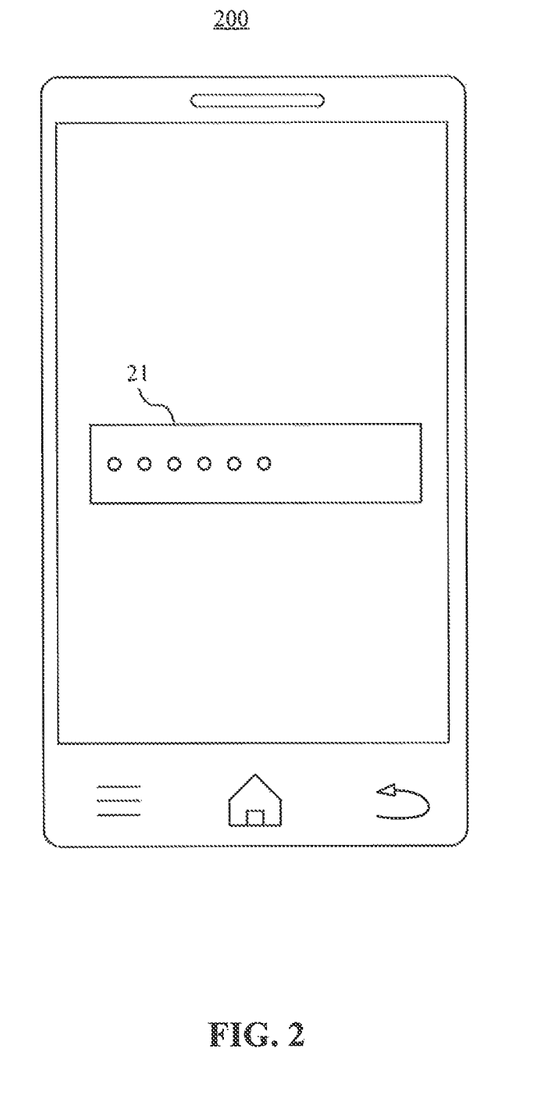
FIG. 2 is a schematic diagram of a screen unlock interface, according to an exemplary embodiment.

FIG. 2 shows a schematic diagram of a screen unlock interface 200, according to an exemplary embodiment. Referring to FIG. 2, the screen unlock interface 200 provides a password indicator 21 for indicating a number of current input characters without providing, e.g., an "UNLOCK" icon. The password indicator 21 may or may not display the current input characters. Assuming a length of the preset password is of 6 characters, the screen will be unlocked directly after the 6-character password is correctly inputted by the user.

Figure 3:
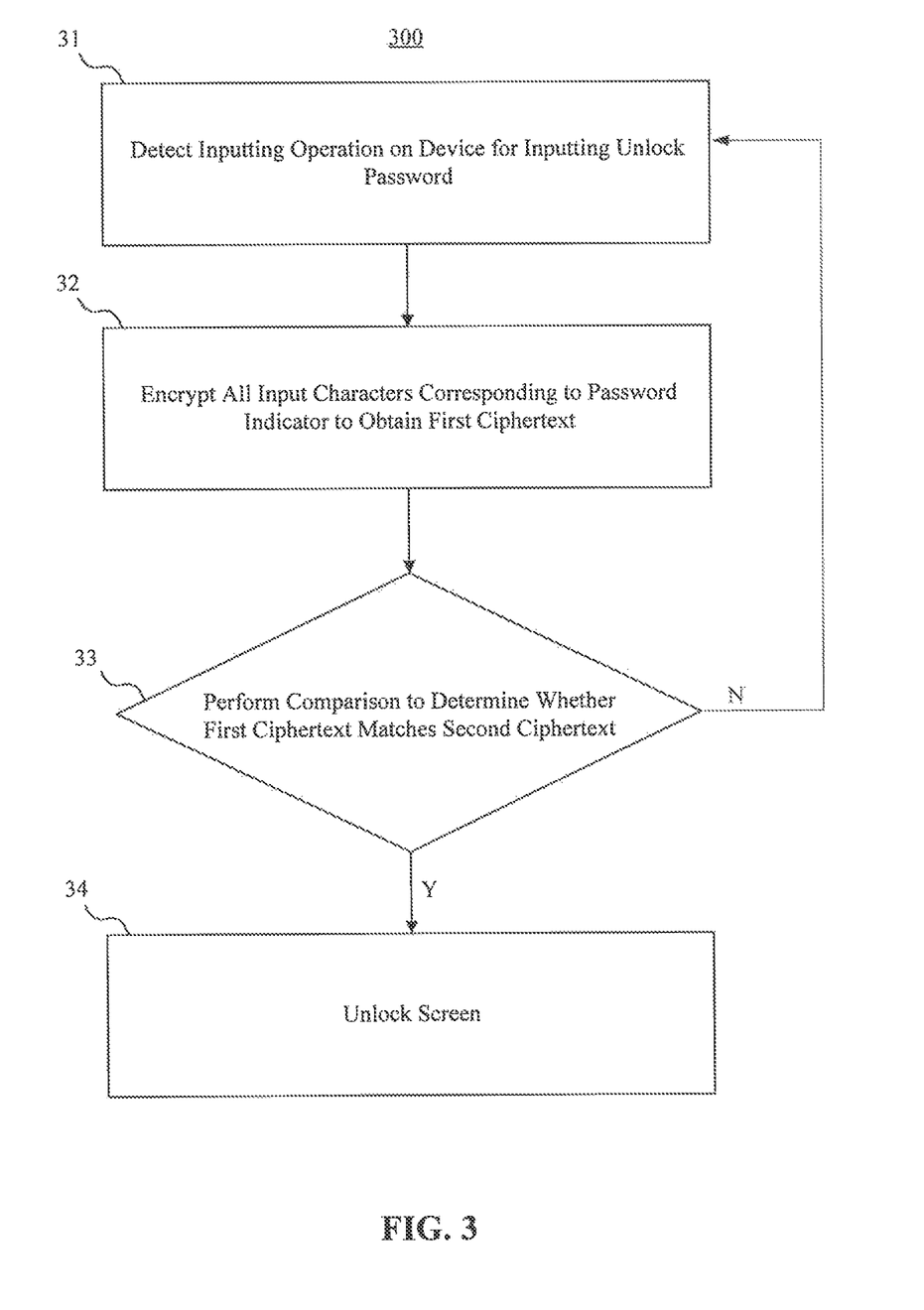
FIG. 3 is a flowchart of a method for unlocking a screen of a device, according to an exemplary embodiment.

FIG. 3 is a flowchart of a method 300 for unlocking the screen of the device, according to an exemplary embodiment. In the illustrated embodiment, the device encrypts the preset password to a second ciphertext in advance using a preset encryption algorithm, and stores the second ciphertext. Referring to FIG. 3, the method 300 includes the following steps.

In step 31, the device detects an inputting operation by the user on the device for inputting the unlock password, the inputting operation causing one character to be inputted to the device. In step 32, the device encrypts all input characters corresponding to the password indicator using the preset encryption algorithm, to obtain a first ciphertext. In step 33, the device performs a comparison to determine whether the first ciphertext matches the second ciphertext. The device proceeds to step 34 if the first ciphertext matches the second ciphertext; otherwise, the device returns to the detecting (step 31). In step 34, the device unlocks the screen. By encrypting the preset password and the input characters of the unlock password, password safety is improved.

Figure 4:
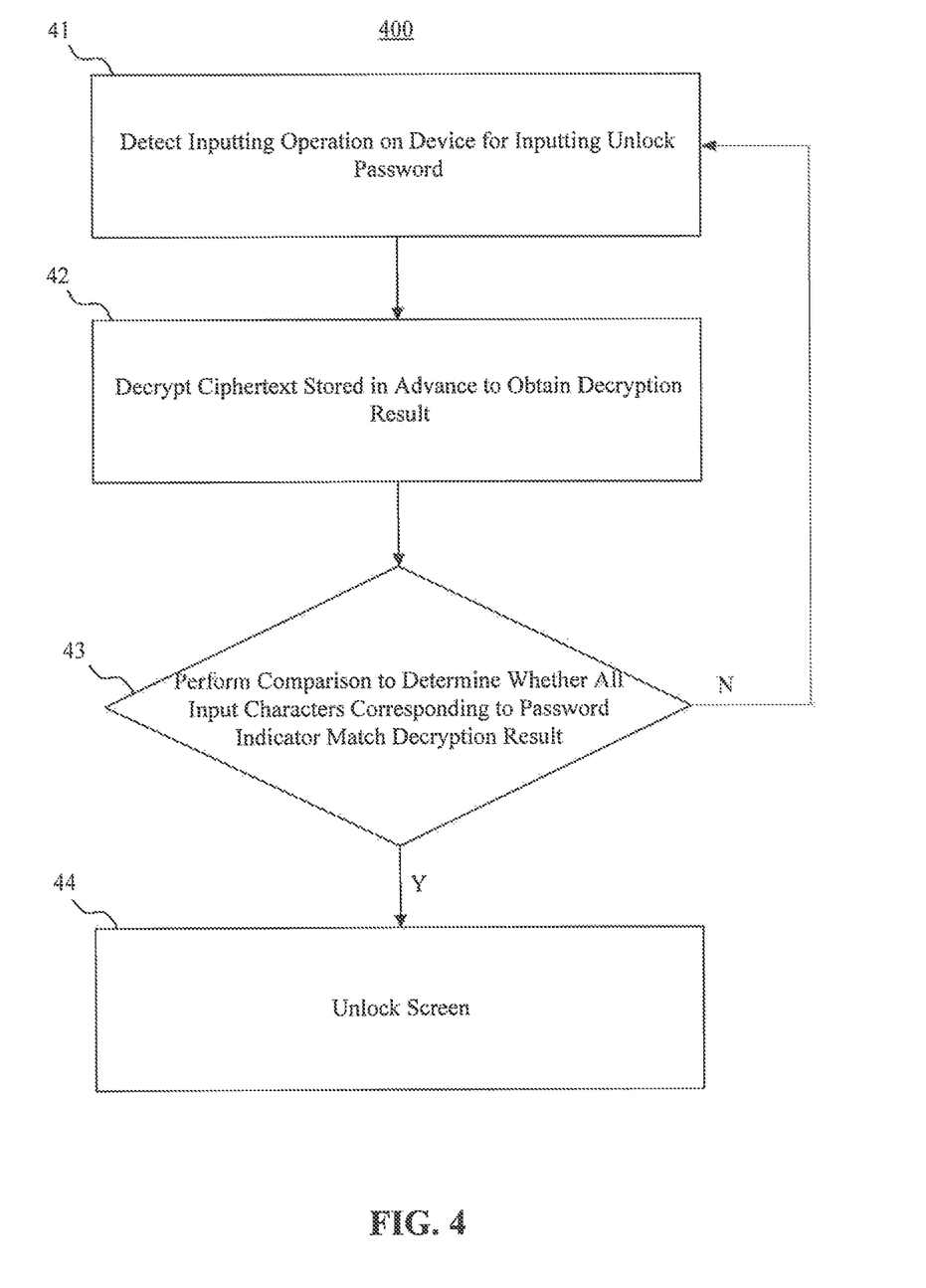
FIG. 4 is a flowchart of a method for unlocking a screen of a device, according to an exemplary embodiment.

FIG. 4 is a flowchart of a method 400 for unlocking the screen of the device, according to an exemplary embodiment. In the illustrated embodiment, the device encrypts the preset password in advance using a preset encryption algorithm to obtain a ciphertext, and stores the ciphertext. Referring to FIG. 4, the method 400 includes the following steps.

In step 41, the device detects an inputting operation by the user on the device for inputting the unlock password, the inputting operation causing one character to be inputted to the device. In step 42, the device decrypts the ciphertext stored in advance based on the preset encryption algorithm to obtain a decryption result. In step 43, the device performs a comparison to determine whether all input characters corresponding to the password indicator match the decryption result. The device proceeds to step 44 if it is determined that all input characters corresponding to a password indicator match the decryption result; otherwise, the device returns to the detecting (step 41). In step 44, the device unlocks the screen.

Figure 5:
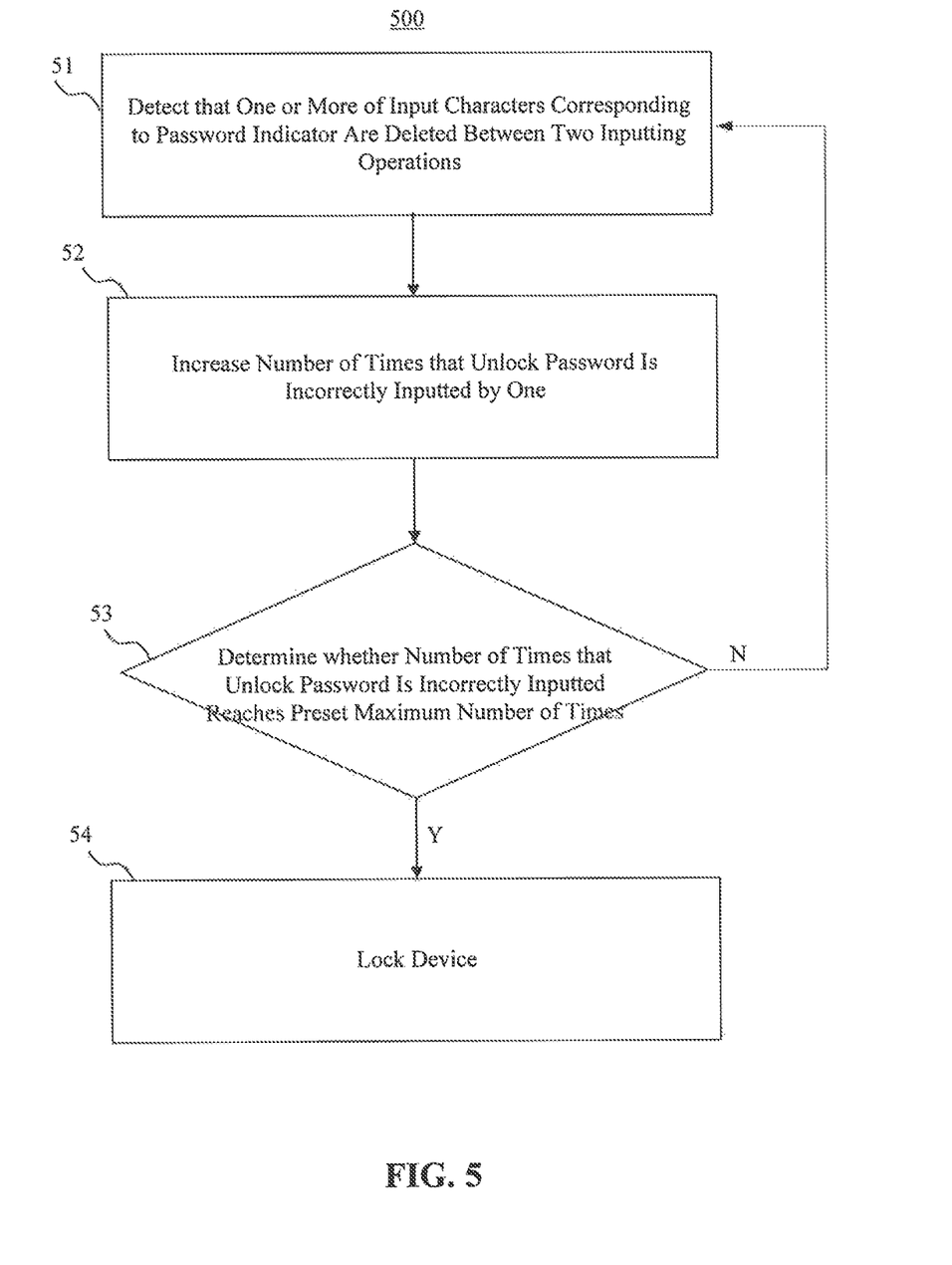
FIG. 5 is a flowchart of a method for a device to count a number of times that an unlock password is incorrectly inputted, according to an exemplary embodiment.

FIG. 5 is a flowchart of a method 500 for the device to count a number of times that the unlock password is incorrectly inputted, according to an exemplary embodiment. Referring to FIG. 5, the method 500 includes the following steps.

In step 51, the device detects that one or more of the input characters corresponding to the password indicator are deleted by the user between two inputting operations. In step 52, the device increases a number of times that the unlock password is incorrectly inputted by one. For example, an initial value of the number of times that the unlock password is incorrectly inputted is preset as zero. In step 53, the device determines whether the number of times that the unlock password is incorrectly inputted reaches a preset maximum number of times, and proceeds to step 54 if the device determines that the number of times that the unlock password is incorrectly inputted reaches the preset maximum number of times; otherwise the device returns to the detecting (step 51). In step 54, the device locks itself.

In the illustrated embodiment, if one or more of the input characters are deleted by the user between two inputting operations, regardless of how many characters are deleted, the device increases the number of times that the unlock password is incorrectly inputted by one. Referring back to FIG. 2, for example, assuming that the length of the preset password is 6 characters, the user may delete one or more current input characters corresponding to the password indicator 21 to re-enter new characters, if the screen is not unlocked after 6 characters are inputted. For example, the user may delete the last 3 characters, i.e., the $4^{th}$ to $6^{th}$ characters, and then re-enter new $4^{th}$ to $6^{th}$ characters. In this case, the device increases the number of times that the unlock password is incorrectly inputted by one. As another example, the user may delete all 6 current input characters and then re-enter new $1^{st}$ to $6^{th}$ characters. In this case, the device also increases the number of times that the unlock password is incorrectly inputted by one.

Figure 6:
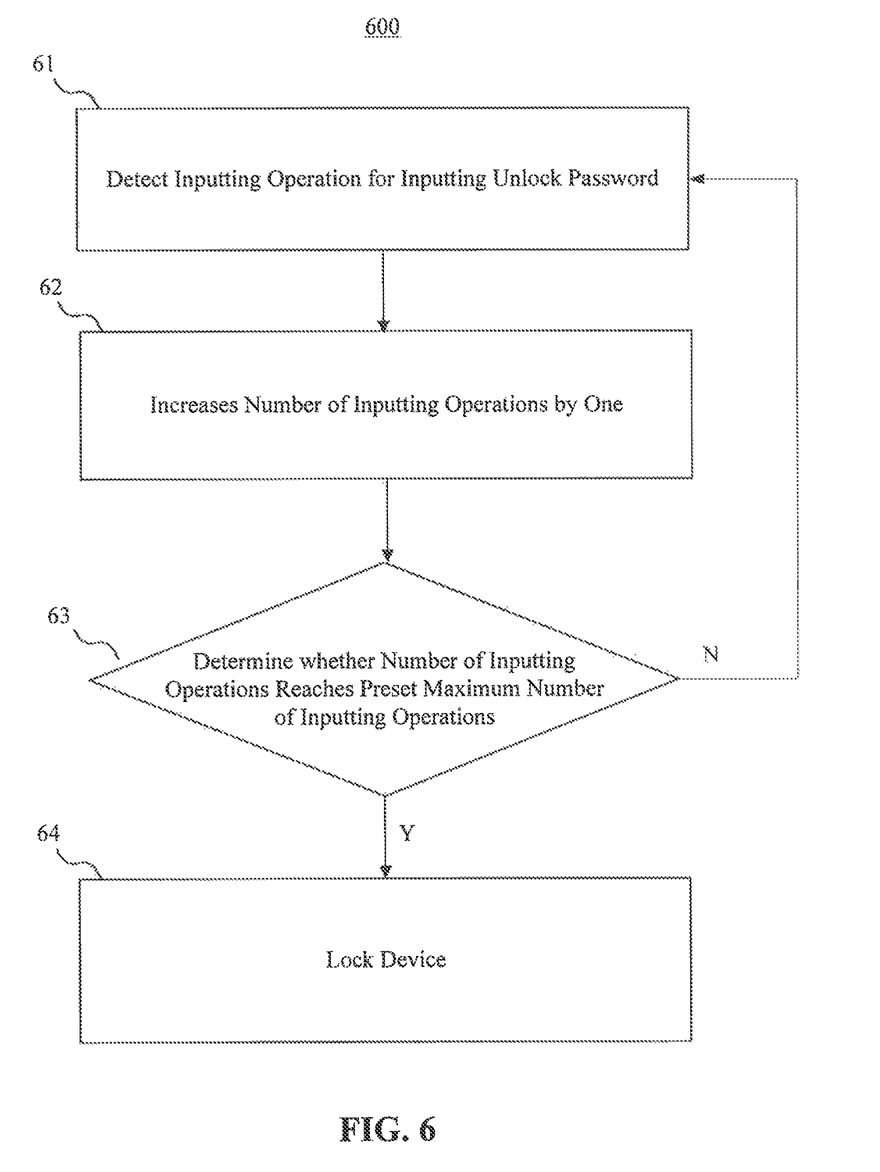
FIG. 6 is a flowchart of a method for a device to determine that an unlock password is incorrectly inputted, according to an embodiment.

FIG. 6 is a flowchart of a method 600 for the device to determine that the unlock password is incorrectly inputted, according to an exemplary embodiment. Referring to FIG. 6, the method 600 includes the following steps.

In step 61, the device detects an inputting operation performed by the user for inputting the unlock password. In step 62, the device increases a number of inputting operations by one. In step 63, the device determines whether the number of inputting operations reaches a preset maximum number of inputting operations, and proceeds to step 64 if the device determines that the number of inputting operations reaches the preset maximum number; otherwise, the device returns to the detecting (step 61). In step 64, the device locks itself.

Referring back to FIG. 2, for example, assuming that the 6 characters corresponding to the password indicator 21 are characters re-entered by the user after all 6 previously input characters are deleted, the device counts the number of inputting operations by the user to be 12.

The maximum number of inputting operations may be preset arbitrarily. In one exemplary embodiment, the maximum number of inputting operations may be preset to be equal to a value obtained by subtracting one from an integer multiple of a maximum length specified for the unlock password. For example, if the device uses the Android operating system, the length specified for the unlock password ranges from 4 to 17 characters. Because the maximum length specified for the unlock password is 17, the maximum number of inputting operations may be set to, e.g., 17×3−1=50, and the device locks itself when the number of inputting operations by the user reaches 50 and the password is still incorrect.

Figure 7:
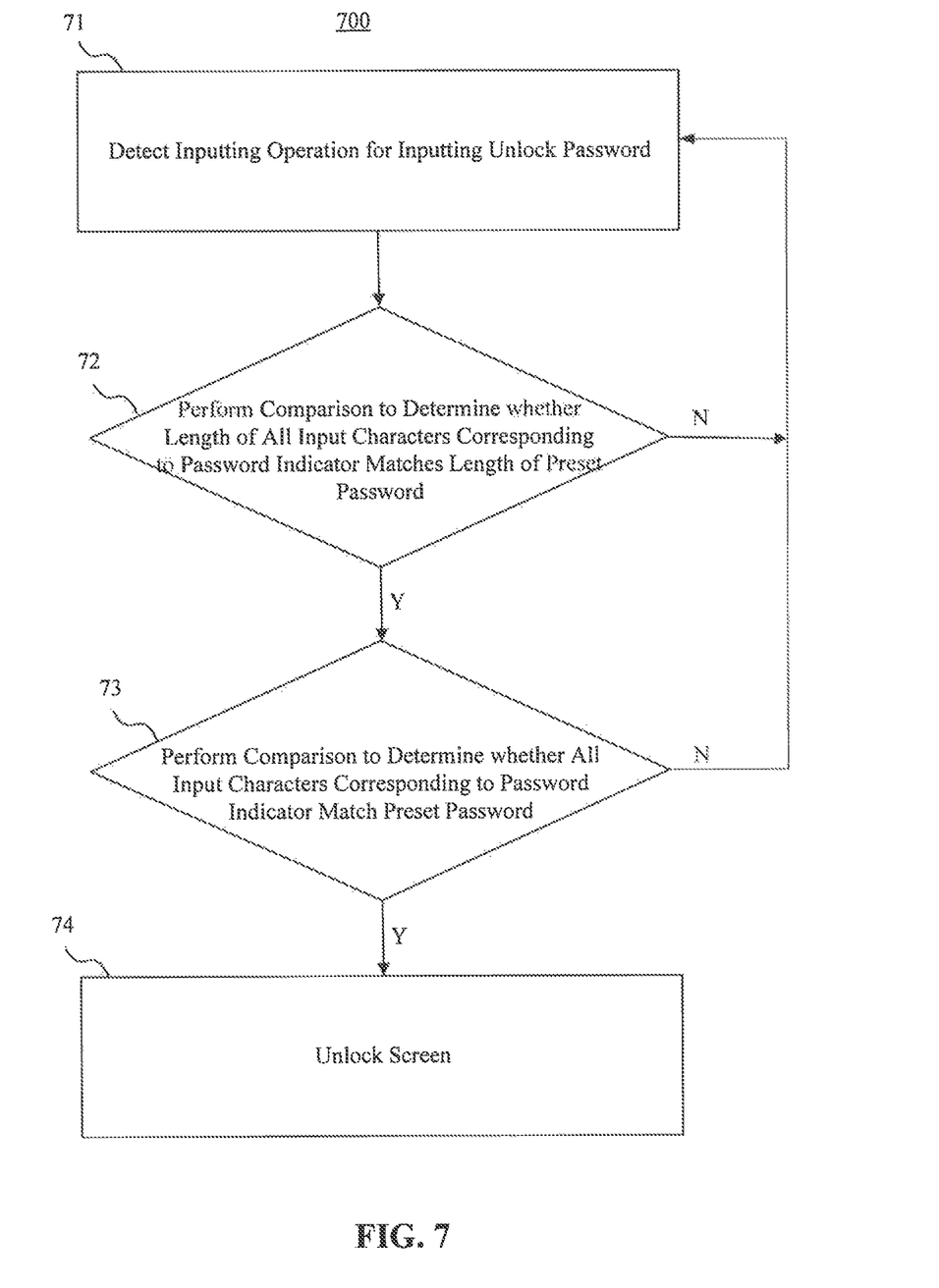
FIG. 7 is a flowchart of a method for unlocking a screen of a device, according to an exemplary embodiment.

FIG. 7 is a flowchart of a method 700 for unlocking the screen of the device, according to an exemplary embodiment. Referring to FIG. 7, the method 700 includes the following steps.

In step 71, the device detects an inputting operation by a user for inputting the unlock password, the inputting operation causing one character to be inputted to the device. In step 72 the device performs a comparison to determine whether a length of all input characters corresponding to the password indicator matches a length of the preset password, and proceeds to step 73 if the device determines that the length of all the input characters corresponding to the password indicator matches the length of the preset password; otherwise, the device returns to the detecting (step 71).

In one exemplary embodiment, the device encrypts the length of the preset password in advance using a preset encryption algorithm to obtain a ciphertext, and stores the ciphertext. Accordingly, the device decrypts the stored ciphertext based on the preset encryption algorithm to obtain a decryption result, and performs a comparison to determine whether the length of all the input characters corresponding to the password indicator matches the decryption result. If they match, the device determines that the length of all the input characters corresponding to the password indicator matches the length of the preset password.

In step 73, the device performs a comparison to determine whether all the input characters corresponding to the password indicator match the preset password, and proceeds to step 74 if all the characters corresponding to the password indicator match the preset password; otherwise, the device returns to the detecting (step 71).

In one exemplary embodiment, the device encrypts the preset password preset in advance using a preset encryption algorithm to obtain a second ciphertext, and stores the second ciphertext. Accordingly, the device encrypts all the input characters corresponding to the password indicator using the preset encryption algorithm to obtain a first ciphertext, and performs a comparison to determine whether the first ciphertext matches the second ciphertext. If the first ciphertext matches the second ciphertext, the device determines that all the input characters corresponding to the password indicator match the preset password. Alternatively, the device decrypts the second ciphertext based on the preset encryption algorithm to obtain a decryption result, and performs a comparison to determine whether all the input characters corresponding to the password indicator match the decryption result. If all the input characters corresponding to the password indicator match the decryption result, the device determines that all the input characters corresponding to the password indicator match the preset password.

In step 74, the device unlocks the screen.

Figure 8:
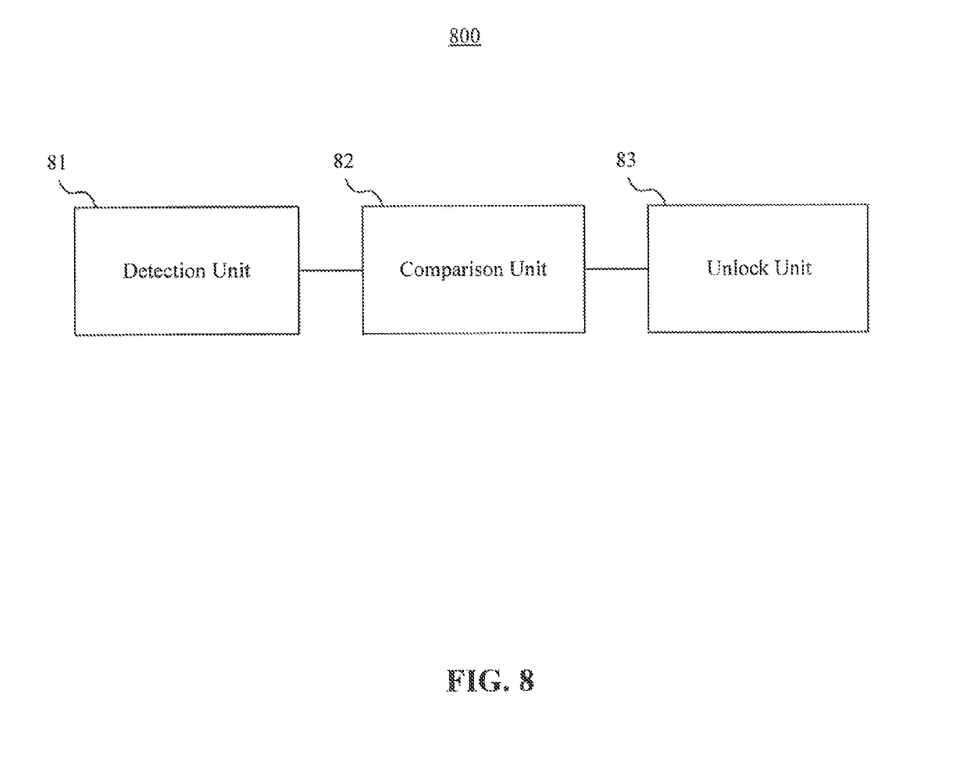
FIG. 8 is a block diagram of a device, according to an exemplary embodiment.

FIG. 8 is a block diagram of a device 800, according to an exemplary embodiment. For example, the device 800 may be a mobile terminal having a screen. Referring to FIG. 8, the device 800 includes a detection unit 81 configured to detect an inputting operation by a user on the device for inputting an unlock password; a comparison unit 82 configured to perform a comparison to determine whether all input characters corresponding to a password indicator displayed on the screen match a password preset by the user; and an unlock unit 803 configured to unlock the screen if it is determined that all the input characters corresponding to the password indicator match the preset password.

In one exemplary embodiment, the comparison unit 82 includes an encryption module (not shown) and a comparison module (not shown). The encryption module is configured to encrypt all the input characters corresponding to the password indicator using a preset encryption algorithm to obtain a first ciphertext, and to encrypt the preset unlock password in advance to obtain a second ciphertext. The comparison module is configured to compare whether the first ciphertext matches the second ciphertext to determine whether all the input characters corresponding to the password indicator match the preset password.

In one exemplary embodiment, the comparison unit 82 includes a decryption module (not shown) and a comparison module (not shown). The decryption module is configured to decrypt a ciphertext stored in the device in advance, which is generated by applying a preset encryption algorithm to the preset unlock password, to obtain a decryption result. The comparison module is configured to perform a comparison to determine whether all the input characters corresponding to the password indicator match the decryption result.

In exemplary embodiments, the device 800 further includes a counting unit (not shown) and a locking unit (not shown). For example, the counting unit is configured to increase a number of times that the unlock password is incorrectly inputted by one if the detection unit 81 detects one or more of the input characters corresponding to the password indicator are deleted by the user between two inputting operations; and the locking unit is configured to lock the device 800 when the number of times that the unlock password is incorrectly inputted reaches a preset maximum number. Also for example, the counting unit is configured to increase a number of inputting operations by the user by one if the detection unit 81 detects an inputting operation performed by the user for inputting the unlock password, and the locking unit is configured to lock the device 800 when the number of inputting operations for inputting the unlock password reaches a preset maximum number.

One of ordinary skill in the art will understand that the above described units can each be implemented by hardware, or software, a combination of hardware and software. One of ordinary skill in the art will also understand that multiple ones of the above described units may be combined as one unit, and each of the above described units may be further divided into a plurality of sub-units or modules.

Figure 9:
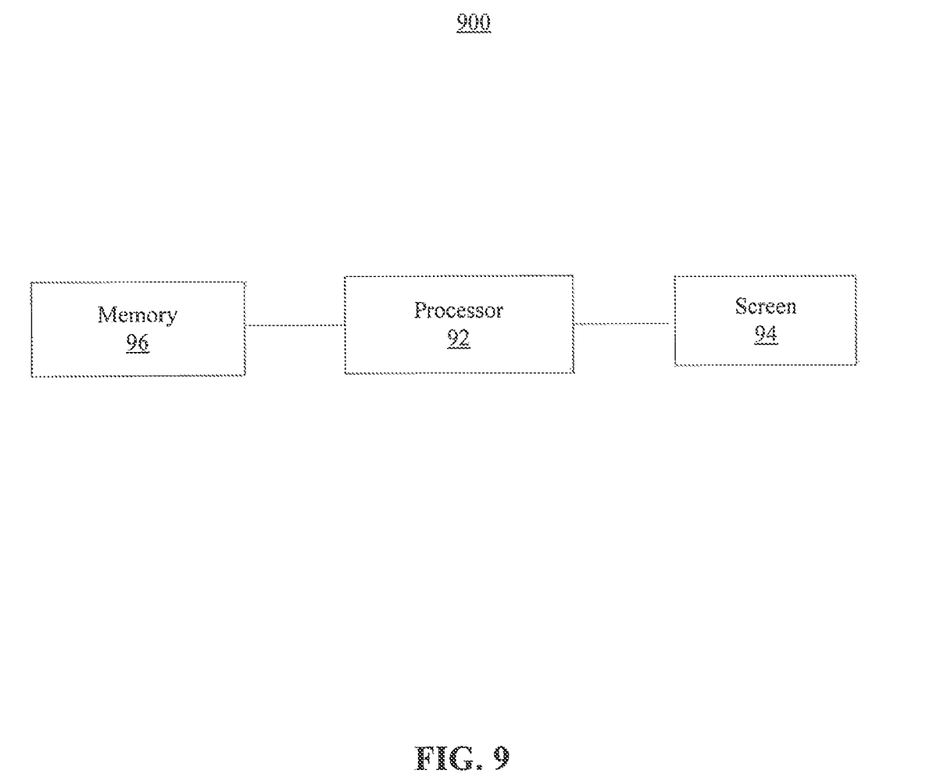
FIG. 9 is a block diagram of a device, according to an exemplary embodiment.

FIG. 9 is a block diagram of a device 900, according to an exemplary embodiment. Referring to FIG. 9, the device 900 includes a processor 92, a screen 94, and memory resources, represented by a memory 96, for storing data as well as for storing program instructions and otherwise facilitating operation of the processor 92. In exemplary embodiments, there is also provided a non-transitory computer-readable medium including instructions, such as included in the memory 96, executable by the processor 92 in the device 900, for performing the above-described methods.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for unlocking a screen of a device, comprising:
   detecting an inputting operation on the device for inputting an unlock password, the inputting operation causing one character to be inputted to the device;
   performing, in response to the detecting, a comparison to determine whether all input characters corresponding to a password indicator displayed on the screen match a preset password;
   unlocking the screen of the device if it is determined that all the input characters corresponding to the password indicator match the preset password;
   detecting whether one or more input characters are deleted between two inputting operations;
   increasing a number of times that the unlock password is incorrectly inputted by one, if it is detected that one or more inputted characters are deleted between two inputting operations;
   determining whether the number of times that the unlock password is incorrectly inputted reaches a preset maximum number of times; and
   locking the device if it is determined that the number of times that the unlock password is incorrectly inputted reaches the preset maximum number of times.

2. The method of claim 1, wherein the performing comprises:
   performing a comparison to determine whether a length of all the input characters corresponding to the password indicator matches a length of the preset password; and
   performing the comparison to determine whether all the input characters corresponding to the password indicator match the preset password, if it is determined that the length of all the input characters corresponding to the password indicator matches the length of the preset password.

3. The method of claim 1, wherein the device encrypts the preset password using a preset encryption algorithm to obtain a second ciphertext and stores the second ciphertext, the performing comprising:
   encrypting all the input characters corresponding to the password indicator using the preset encryption algorithm to obtain a first ciphertext;
   performing a comparison to determine whether the first ciphertext matches the second ciphertext; and
   determining all the input characters corresponding to the password indicator match the preset password if it is determined that the first ciphertext matches the second ciphertext.

4. The method of claim 1, wherein the device encrypts the preset password using a preset encryption algorithm to obtain a ciphertext and stores the ciphertext, the performing comprising:
   decrypting the ciphertext based on the preset encryption algorithm to obtain a decryption result;
   performing a comparison to determine whether all the input characters corresponding to the password indicator match the decryption result; and
   determining that all the input characters corresponding to the password indicator match the preset password, if it is determined that all the input characters corresponding to the password indicator match the decryption result.

5. The method of claim 2, wherein the device encrypts the length of the preset password using a preset encryption algorithm to obtain a ciphertext and stores the ciphertext, the performing of the comparison to determine whether the length of all the input characters corresponding to the password indicator matches the length of the preset password comprising:
   decrypting the ciphertext based on the preset encryption algorithm to obtain a decryption result;
   performing a comparison to determine whether the length of all the input characters corresponding to the password indicator matches the decryption result; and
   determining that the length of all the input characters corresponding to the password indicator matches the length of the preset password, if it is determined that the length of all the characters corresponding to the password indicator matches the decryption result.

6. The method of claim 1, further comprising:
   increasing a number of inputting operations by one when the device detects an inputting operation for inputting the unlock password;
   determining whether the number of inputting operations reaches a preset maximum number of inputting operations; and
   locking the device if it is determined that the number of inputting operations reaches the preset maximum number of inputting operations.

7. The method of claim 6, wherein the device determines the preset maximum number of inputting operations by subtracting one from an integer multiple of a maximum length specified for the unlock password.

8. A device, comprising:
   a processor; and
   a screen,
   wherein the processor is configured to:
      detect an inputting operation on the device for inputting an unlock password, the inputting operation causing one character to be inputted to the device;
      perform, in response to the detecting, a comparison to determine whether all input characters corresponding to a password indicator displayed on the screen match a preset password;
      unlock the screen if it is determined that all the input characters corresponding to the password indicator match the preset password;
      detect whether one or more input characters are deleted between two inputting operations;
      increase a number of times that the unlock password is incorrectly inputted by one, if it is detected that one or more inputted characters are deleted between two inputting operations;
      determine whether the number of times that the unlock password is incorrectly inputted reaches a preset maximum number of times; and
      lock the device if it is determined that the number of times that the unlock password is incorrectly inputted reaches the preset maximum number of times.

9. The device of claim 8, wherein the processor is further configured to:
   perform a comparison to determine whether a length of all the input characters corresponding to the password indicator matches a length of the preset password; and
   perform the comparison to determine whether all the input characters corresponding to the password indicator match the preset password, if it is determined that the length of all the input characters corresponding to the password indicator matches the length of the preset password.

10. The device of claim 8, wherein the device encrypts the preset password using a preset encryption algorithm to obtain a second ciphertext and stores the second ciphertext, the processor being further configured to:

encrypt all the input characters corresponding to the password indicator using the preset encryption algorithm to obtain a first ciphertext;

perform a comparison to determine whether the first ciphertext matches the second ciphertext; and     determine all the input characters corresponding to the password indicator match the preset password if it is determined that the first ciphertext matches the second ciphertext.

11. The device of claim 8, wherein the device encrypts the preset password using a preset encryption algorithm to obtain a ciphertext and stores the ciphertext, the processor being further configured to:

decrypt the ciphertext based on the preset encryption algorithm to obtain a decryption result;

perform a comparison to determine whether all the input characters corresponding to the password indicator match the decryption result; and     determine that all the input characters corresponding to the password indicator match the preset password, if it is determined that all the input characters corresponding to the password indicator match the decryption result.

12. The device of claim 9, wherein the device encrypts the length of the preset password using a preset encryption algorithm to obtain a ciphertext and stores the ciphertext, the processor being further configured to:

decrypt the ciphertext based on the preset encryption algorithm to obtain a decryption result;

perform a comparison to determine whether the length of all the input characters corresponding to the password indicator matches the decryption result; and     determine that the length of all the input characters corresponding to the password indicator matches the length of the preset password, if it is determined that the length of all the characters corresponding to the password indicator matches the decryption result.

13. The device of claim 8, wherein the processor is further configured to:

increase a number of inputting operations by one when the device detects an inputting operation for inputting the unlock password;

determine whether the number of inputting operations reaches a preset maximum number of inputting operations; and     lock the device if it is determined that the number of inputting operations reaches the preset maximum number of inputting operations.

14. The device of claim 13, wherein the processor is further configured to determine the preset maximum number of inputting operations by subtracting one from an integer multiple of a maximum length specified for the unlock password.

15. A non-transitory computer-readable medium having stored therein instructions that, when executed by a processor of a device, cause the device to perform a method for unlocking a screen of the device, the method comprising:

detecting an inputting operation on the device for inputting an unlock password, the inputting operation causing one character to be inputted to the device;

performing, in response to the detecting, a comparison to determine whether all input characters corresponding to a password indicator displayed on the screen match a preset password;

unlocking the screen of the device if it is determined that all the input characters corresponding to the password indicator match the preset password;

detecting whether one or more input characters are deleted between two inputting operations;

increasing a number of times that the unlock password is incorrectly inputted by one, if it is detected that one or more inputted characters are deleted between two inputting operations;

determining whether the number of times that the unlock password is incorrectly inputted reaches a preset maximum number of times; and     locking the device if it is determined that the number of times that the unlock password is incorrectly inputted reaches the preset maximum number of times.

* * * * *